June 14, 1932. P. B. GODDARD 1,863,244
BEARING FOR BALLS OF UNIVERSAL JOINTS, ETC
Filed April 2, 1930
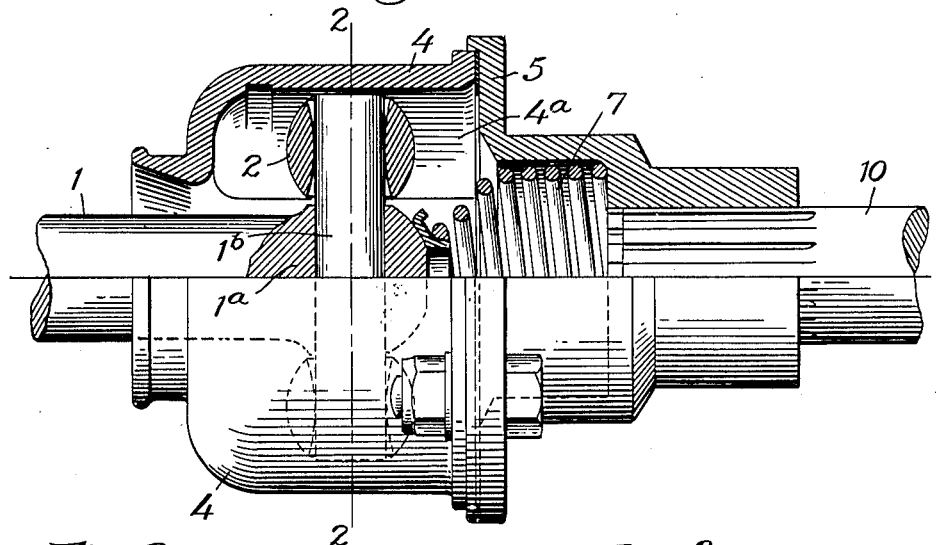
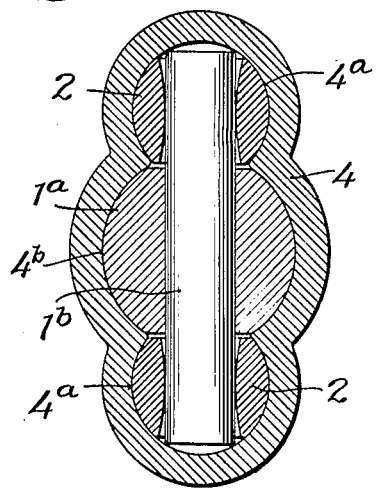
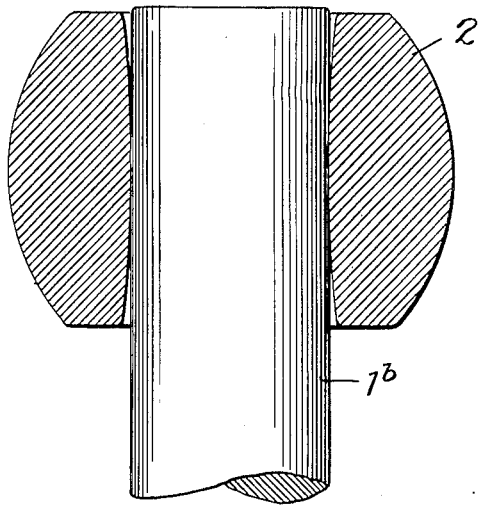
Inventor
Paul B. Goddard
By Alexander Foxell
Attorneys Patented June 14, 1932

1,863,244

UNITED STATES PATENT OFFICE

PAUL B. GODDARD, OF DETROIT, MICHIGAN, ASSIGNOR TO THE UNIVERSAL PRODUCTS CO., INC., OF DEARBORN, MICHIGAN, A CORPORATION OF DELAWARE

BEARING FOR BALLS OF UNIVERSAL JOINTS, ETC.

Application filed April 2, 1930. Serial No. 441,076.

This invention in its specific sense is an improvement in the manner of mounting the anti-friction balls or spherical bushings upon the pins in so-called ball-bearing universal joints; and as so applied its object is to enable the balls to have a slight self adjusting movement relative to the pins upon which they are mounted and to insure better lubrication of the balls upon the pins, thereby materially enhancing the ease of operation and durability of the joint.

In another aspect of the invention it relates to novel means by which one member which receives a concentrated load is enabled to transmit it most effectively to another member of the transmission unit.

The transmission of a load from one member, through the bearing surfaces, to another member must, when the load is excessive, always result in some deflection or deformation of the contacting surfaces to an extent which may be immeasurably small but is, in fact, appreciable and such deformation usually results in stresses, on portions of the bearing which are most affected, sufficient to rupture the oil film between the surfaces at such points and create a condition of metal to metal contact which may entirely destroy the correctly established bearing surfaces.

I have discovered that this disadvantageous condition can be entirely overcome by so forming the surface of one of the bearing members relative to the others that in its unloaded state the two surfaces are not parallel throughout but they may become truly parallel yet maintain an unbroken oil film between the bearing surfaces under load stresses. By providing such bearing surfaces the oil film is maintained when in unloaded condition; and when under load the deflection of the surfaces equals the distortion and the bearing surface assumes that relative form least likely to damage the oil film.

I will explain the invention with reference to the accompanying drawing which shows the same as utilized in a ball-bearing universal joint, and an explanation thereof will enable others to adopt and use the same not only in such joints but in other places in the mechanical arts where it will be found useful. In the claims I have summarized the essentials of the invention, the novel features of construction, and the novel combinations of parts, for which protection is desired.

In said drawing:

Fig. 1 represents a partial longitudinal sectional elevation of a ball-bearing universal joint, in which the balls are mounted upon the pin in accordance with my invention.

Fig. 2 is a transverse section on the line 2—2, Fig. 1.

Fig. 3 is an enlarged section through one of the balls as mounted on the pin.

The type of joint illustrated in Figs. 1 and 2 comprises a shaft member 1 having a spherical head $1a$ transfixed by a pin $1b$ on whose ends at opposite sides of the head $1a$ are rotatably mounted anti-friction balls 2. The head $1a$ and balls 2 are entered into a member 4 of a casing which is provided with an axial bore $4b$, slightly larger in diameter than the head $1a$, and with slots $4a$ at diametrically opposite sides of bore $4b$, and opening at their inner sides into the bore $4b$, as indicated in Fig. 2. The head $1a$ moves in bore $4b$ and balls 2 move in the slots $4a$ as shown. The part 4 is open at its outer end, through which the shaft 1 enters, and its inner end is attached to the end of a complemental casing member 5 affixed to a shaft 10. An expansion spring 7, is placed in the casing member 5 between the inner end of shaft 10 and the head $1a$ of the shaft 1. The foregoing parts are more fully disclosed in J. B. Flick's Patents Nos. 1,508,653 and 1,512,840 and require no further explanation herein.

Referring to Fig. 2 it will be readily apparent that if the shaft 1 is rotated in the direction of the indicating arrow the load pressure will be imparted to the balls 2 and will be transmitted thereby to the member 4. This condition causes extreme pressure upon the ends of the plain metallic bearing surfaces of the members as heretofore constructed (with parallel contacting surfaces) and creates conditions adverse to the maintenance of a satisfactory and sufficient oil film and vastly increases the unit bearing pressures at the deflected points.

I have discovered that disadvantageous conditions may be obviated by deforming the bores, or female bearing surfaces in the balls, as shown; that is the bore of each ball is slightly enlarged from its center toward each end thereof as shown in Fig. 3, so that the annular bearing surface of the bore which contacts with the pin bore varies in diameter at all points, and in inverse ratio to the load at any point, so that the central point is least in diameter and the diameters progressively increase until at the ends of the bore they are the largest, the progression and ratio of increase being determined by the form and yield of the section under concentrated loading.

Heretofore it has been customary in the manufacture of universal joints to have the bores in the balls or spherical bushings 2 straight or cylindric to fit closely onto or against the cylindric pin 1b throughout the length of the bore. This had a tendency at times to cramp the balls on the pin, and to also prevent proper lubrication thereof. These defects and objectionable features are obviated by slightly enlarging the bore of each ball from the center to each end thereof as indicated; and as a result of this construction the balls are capable of a slight universal self adjusting movement upon the pin. Instead of having a close sliding fit between the bore of the ball and the pin throughout the length of the bore, as heretofore, I have provided a line contact at all times between the ball of the pin and the bore under ordinary pressure conditions but this contact surface will increase under pressure by deflection of the walls in accordance with the overload thus insuring better lubrication thereof and easier movement of the parts.

It will be seen that in this invention one of the bearing surfaces, in this instance the pin, has all its load sustaining surfaces parallel to the axis of the pin, while the load sustaining surfaces of the outer member, in this instance the ball, are curved relatively to the surface of the pin. Thus the pin or load receiving member has ball engaging contact surfaces which are longitudinally approximately parallel to its axis; while the ball or load transmitting member has pin engaging contact surfaces which are not parallel to the axis of the coacting load receiving member and provide predetermined variable clearances between the load receiving and load transmitting member surfaces. The clearance spaces between the said members therefore vary in dimension approximately perpendicular to the axis of the receiving member, which enables an oil film to be established and maintained between said members at all times and under varying conditions of load.

I claim:—

1. In combination a driving and a driven member, a pin on one member adapted to enter a groove in the other member, and a ball having a bore and rotatably mounted on the pin and engaging the groove to transmit pressure from the pin to the groove; said pin and ball normally contacting at the center of the bore and the annular space between the ball and pin within the bore gradually enlarging from center outward toward each end of the bore.

2. In combination a driving and a driven member, a pin on one member adapted to enter a groove in the other member and a ball having a bore and rotatably mounted on the pin and engaging the groove to transmit pressure from the pin to the groove; said pin having a straight cylindric portion transfixing the ball and the bore of the ball gradually enlarging from center outward toward each end.

3. In a universal joint of the character specified, a shaft, a pin transfixing the shaft, a member receiving the head and pin, an anti-friction ball mounted on the pin and engaging the member to transmit motion from the shaft to the member, said pin having a straight cylindric portion transfixing the ball and said ball having a bore for the reception of the pin, the bore gradually enlarging from center outward toward each end whereby an oil film may be established and maintained between the pin and ball at all times and in varying conditions of load.

4. In a universal joint of the character specified, having a drive shaft with a spherical head, a pin transfixing the shaft, a second member engaging the head having grooves for the reception of the ends of the pin; and anti-friction balls mounted on the pin ends and engaging the said grooves, said pin having straight cylindric portions transfixing the balls, and each ball having a bore for the reception of the pin end, said bore gradually enlarging from center outward toward each end whereby an oil film may be established and maintained between the pin and ball at all times and under varying conditions of load.

PAUL B. GODDARD.